United States Patent [19]
Choi et al.

[11] Patent Number: 5,633,688
[45] Date of Patent: May 27, 1997

[54] IMAGE SUPERIMPOSING APPARATUS FOR SUPERIMPOSING THE ENCODED COLOR TELEVISON SIGNAL WITH THE EXTERNAL COMPOSITE VIDEO SIGNAL

[75] Inventors: Hae-min Choi, Kwacheon; Bong-hun Song; Kwang-sik Choi, both of Suwon, all of Rep. of Korea

[73] Assignee: Samsung Electronics Co., Ltd., Kyungki-Do, Rep. of Korea

[21] Appl. No.: 575,016

[22] Filed: Dec. 19, 1995

[30] Foreign Application Priority Data

Dec. 19, 1994 [KR] Rep. of Korea .................. 94-35080
Dec. 19, 1994 [KR] Rep. of Korea .................. 94-35083
Dec. 19, 1994 [KR] Rep. of Korea .................. 94-35084
Dec. 20, 1994 [KR] Rep. of Korea .................. 94-35345

[51] Int. Cl.$^6$ ........................................ H04N 9/74
[52] U.S. Cl. ...................... 348/584; 348/599; 348/524; 348/525
[58] Field of Search ...................... 348/505, 521, 348/524, 525, 529, 530, 531, 563, 564, 565, 566, 567, 584, 588, 589, 598, 599, 600; H04N 9/74, 9/76, 5/445, 5/45, 5/08

[56] References Cited

U.S. PATENT DOCUMENTS 5,065,230  11/1991  Kumano .................. 348/566

*Primary Examiner*—Sherrie Hsia
*Attorney, Agent, or Firm*—Sughrue, Mion, Zinn, Macpeak & Seas

[57] ABSTRACT

An external sync image superimposing apparatus synchronizing an analog video signal with digital image data is provided by an apparatus which includes a sync separator for separating an external composite sync signal from an external composite image signal, a clock signal generator for synchronizing the frequency of the clock signal with an external sync signal according to a phase difference between the horizontal sync signal of the separated external composite sync signal and the internal horizontal sync signal and generating the adjusted clock signal, a sync signal generator receiving the adjusted clock signal for generating an internal composite sync signal and a reproduction address signal, a video memory for reading stored digital video information according to the reproduction address signal and a superimposing circuit for converting the digital video information from the video memory into an RGB signal, encoding the internal composite sync signal and the RGB signal as a color television signal, and superimposing the encoded color television signal with the external composite image signal for output. The apparatus provides high screen quality without distortion, by synchronizing and superimposing the digital image signal onto the image signal.

19 Claims, 7 Drawing Sheets

IMAGE SUPERIMPOSING APPARATUS FOR SUPERIMPOSING THE ENCODED COLOR TELEVISON SIGNAL WITH THE EXTERNAL COMPOSITE VIDEO SIGNAL

BACKGROUND OF THE INVENTION

1. Field of the Invention

The present invention relates to an image superimposing apparatus and, more particularly, to an image superimposing apparatus for superimposing a digital image signal with an external video signal in synchronization.

The instant application is based on Korean Patent Application Nos. 94-35080, 94-35083, 94-35084 and 94-35345, which are incorporated herein by reference for all purposes.

2. Brief Discussion of Related Art

In an image superimposing apparatus such as a video-song accompaniment apparatus, song lyrics are superimposed on an image signal, i.e., a background screen, while the apparatus is reproducing a musical accompaniment signal. In such an apparatus, to facilitate background screen selection, either digital image information prerecorded on recording media or image information supplied from an external video source may be selected as the background screen. To enable such selection, synchronization and level-matching of the video signals should be realized. When superimposing the external analog video signal and the video signal reproduced from digital image data, if the synchronization is not performed correctly, distortion of the screen image occurs.

SUMMARY OF THE INVENTION

The present invention was motivated by a desire to provide an image superimposing apparatus which avoids the problems of the prior art.

An object of the present invention is to provide an image superimposing apparatus for superimposing digital image data and an analog video signal.

Another object of the present invention is to provide an image superimposing apparatus for superimposing digital image data and an analog video signal without output video image degradation.

These and other objects, features and advantages according to the present invention are provided by image superimposing apparatus. Advantageously, the image superimposing apparatus includes:

a synchronization separator for separating an external composite sync signal from an external composite video signal;

a clock signal generator for adjusting the frequency of a clock signal so as to be synchronized with an external sync signal according to a phase difference between a horizontal sync signal of the separated external composite sync signal and an internal horizontal sync signal, thereby generating the adjusted clock signal;

a sync signal generator for generating an internal composite sync signal and a reproduction address signal responsive to the adjusted clock signal from the clock signal generator;

a video memory for reading digital video information stored according to the reproduction address signal from the sync signal generator and writing the digital video information according to a writing address signal; and a superimposing circuit for restoring digital video information read from the video memory circuit as an RGB signal, encoding the internal composite sync signal and the restored RGB signal as a color television signal, and superimposing the encoded color television signal with the external composite video signal to thereby output the image signal.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE PREFERRED EMBODIMENTS

Figure 1:
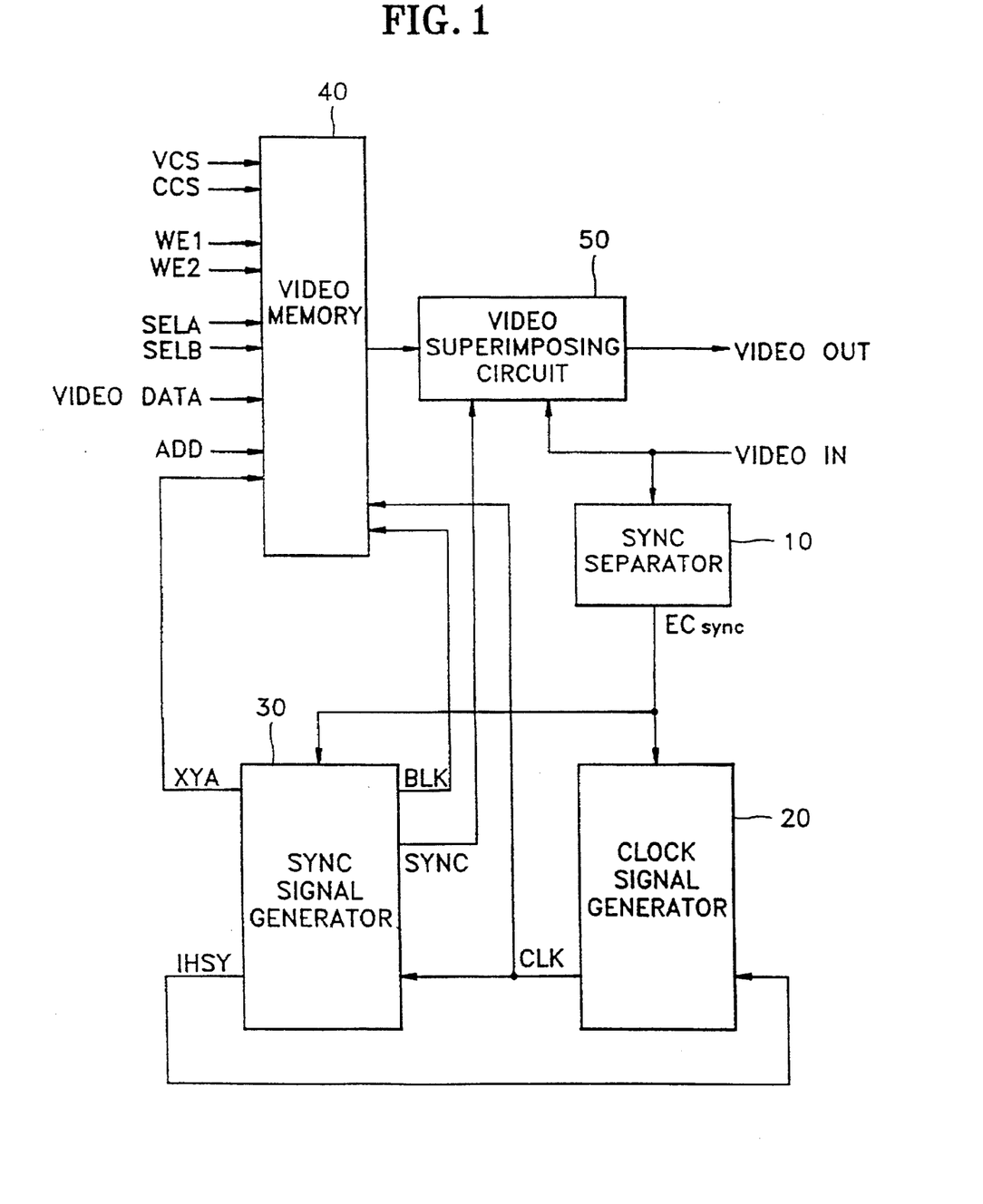
FIG. 1 is a high level block diagram of an image superimposing apparatus according to the present invention.

FIG. 1 shows a high level block diagram of an image superimposing apparatus according to the present invention. According to FIG. 1, the image superimposing apparatus includes a sync separator 10 for separating an external composite sync signal (ECsync) from an external composite image signal, a clock signal generator 20 for adjusting the frequency of a clock signal (CLK) so as to be synchronized with the external composite sync signal according to the phase difference between an internal horizontal sync signal and a horizontal sync signal of the separated external composite sync signal (ECsync) thereby generating the adjusted clock signal, a sync signal generator 30 for generating an internal composite synchronization signal (SYNC) and a reproduction address signal (XYA) responsive to the clock signal generated from clock signal generator 20, a video memory circuit 40 for reading digital video information stored according to the reproduction address signal (XYA) of sync signal generator 30 and writing the digital video information in memory according to a writing address signal (ADD), and a superimposing circuit 50 for producing an image signal by converting the digital video information read from video memory circuit 40 to an RGB signal, encoding the internal composite sync signal and the RGB signal as a television signal, and superimposing the encoded color television signal with the external composite image signal.

Figure 2:
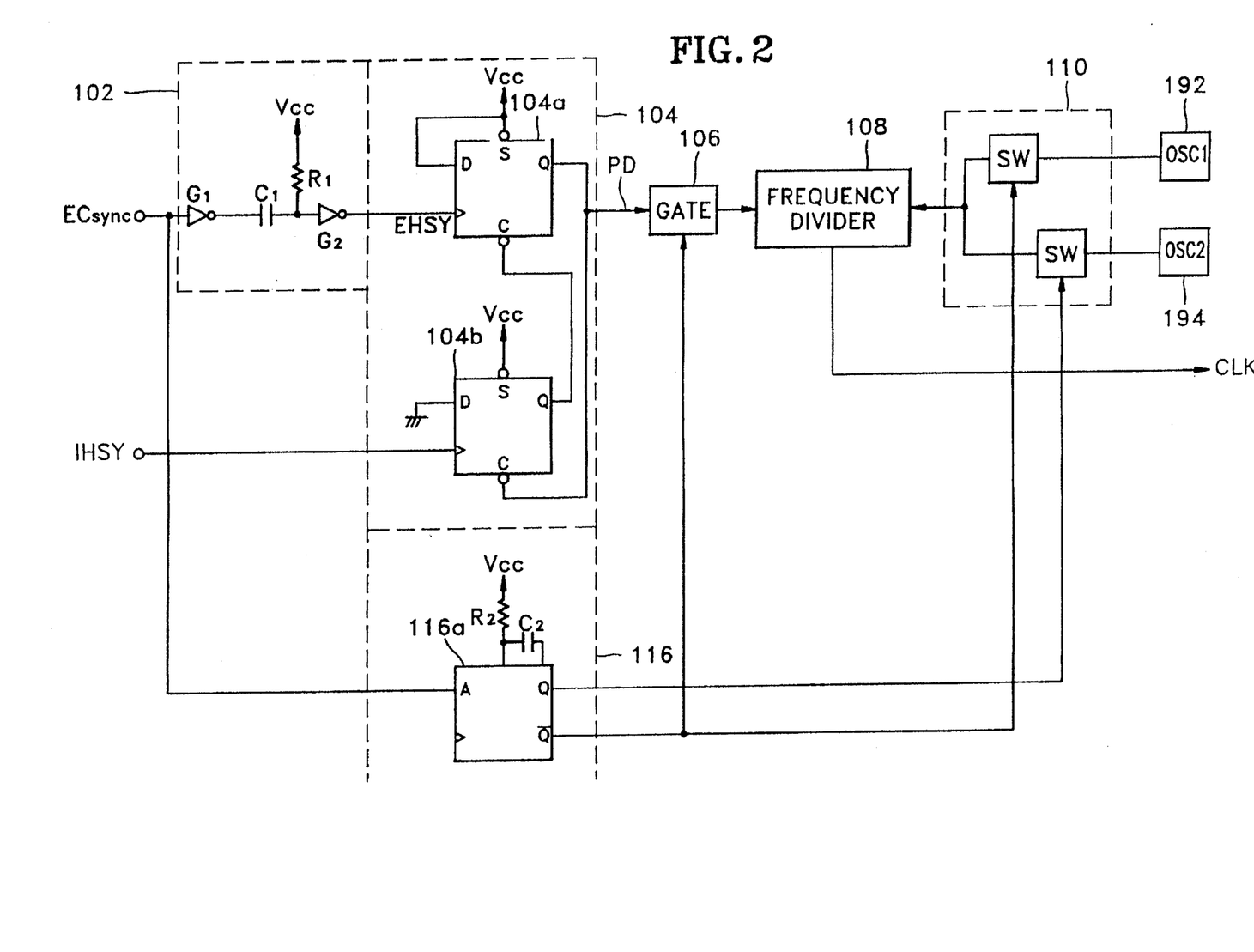
FIG. 2 is a detailed circuit diagram of an exemplary clock signal generator which is usable in the circuit of FIG. 1.

FIG. 2 shows an exemplary circuit for a clock signal generator 20 usable with the circuitry of FIG. 1. Advantageously, clock signal generator 20 includes a horizontal sync separator 102, a phase difference detector 104, a gate 106 acting as gate means, a frequency divider 108, a signal selector 110, a first oscillator 192, a second oscillator 194 and a sync detector 116. Horizontal sync separator 102 preferably supplies the external composite sync signal (ECsync) via an inverter ($G_1$) to a one-shot circuit including a resistor ($R_1$) and a capacitor ($C_1$), wherein the vertical sync signal is removed, so that only an external horizontal sync signal (EHSY) is output through an inverter ($G_2$).

In the phase difference detector 104, a first flip-flop 104a receives the external horizontal sync signal (EHSY), which is output by the horizontal sync separator 102, supplied to the clock port, a +5 Volt power source voltage supplied to the data input and set port and the Q output of a second flip-flop 104b supplied to the clear port. With respect to second flip-flop 104b, an internal horizontal sync signal (IHSY) is supplied to the clock port, the data input is grounded, the power source voltage is supplied to the set port and the Q output of first flip-flop 104a is supplied to the clear port. It should be noted that the Q output of first flip-flop 104a is provided as the phase difference detection signal (PD) between the external horizontal sync signal (EHSY) and the internal horizontal sync signal (IHSY).

In synchronization detector 116, the Q and $\overline{Q}$ outputs of a monostable multi-vibrator 116a which receives the external composite sync signal (ECsync) at its trigger input (A) are respectively provided as the switching control signals of signal selector 110, with the $\overline{Q}$ output also being provided as the control signal of gate 106. Resistor ($R_2$) and a capacitor ($C_2$) are provided for setting the time constant of monostable multi-vibrator 116a. Thus, in case that the external composite sync signal (ECsync) is supplied, a trigger pulse is continuously supplied to the trigger input (A). Accordingly, the Q output stays high while the $\overline{Q}$ output stays low. If the external composite sync signal (ECsync) is not present, the Q output stays high for a duration determined by the RC time constant of resistor $R_2$ and capacitor $C_2$ and then goes low. Therefore, if the external composite sync signal (ECsync) is supplied, signal selector 110 selects and outputs the first oscillation signal (58.5 MHz) of a first oscillator 192, and if the external composite sync signal (ECsync) is removed, the signal selector 110 selects and outputs the second oscillation signal (57.252 MHz) of a second oscillator 194. The first oscillation signal advantageously acts as a reference oscillation signal for matching sync with the image signal reproduced from a laser disk while the second oscillation signal is the standard oscillation signal for matching the sync with an NTSC image signal. Preferably, gate 106 passes the phase difference detection signal (PD) only when the $\overline{Q}$ output of monostable multi-vibrator 116a is low.

In frequency divider 108, during the internal synchronization period, an oscillating signal of 57.252 MHz is input so that the frequency divided clock signal is generated, and at the time of realizing the external synchronization, an oscillating signal of 58.5 MHz is input so that the input oscillating signal is phase-locked to the horizontal sync signal (EHSY) and the frequency divided clock signal (CLK) is generated. It should be noted that during the external synchronization period, the frequency dividing operation is reset by the phase difference so that a clock signal synchronized with the external horizontal sync signal (ECSY) is generated.

Referring back to FIG. 1, the sync signal generator 30 generates the vertical and horizontal sync signals, the internal horizontal sync signal, the vertical and horizontal blanking signal and, the reproduction address signal, responsive to receipt of the frequency divided clock signal (CLK) and the external composite sync signal (ECsync). The generated internal horizontal sync signal (IHSY) is advantageously provided to the phase difference detector 104 of clock signal generator 20. Thus, a phase-locked loop is formed so that signals phase-locked with the external sync signal can be generated during the external synchronization period.

Figure 3:
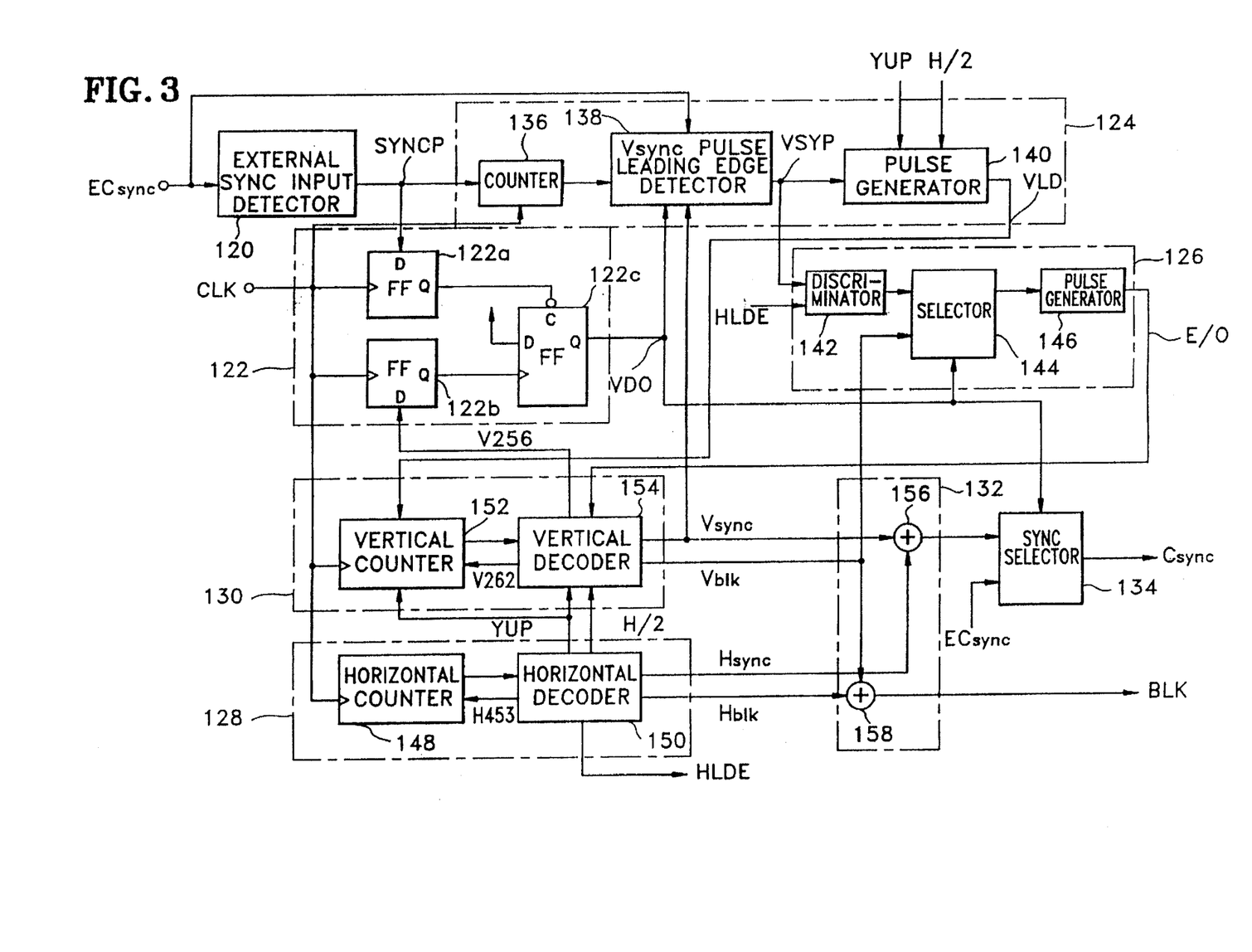
FIG. 3 is a detailed circuit diagram of an exemplary sync signal generator which is usable in the circuit of FIG. 1.
Figure 4:
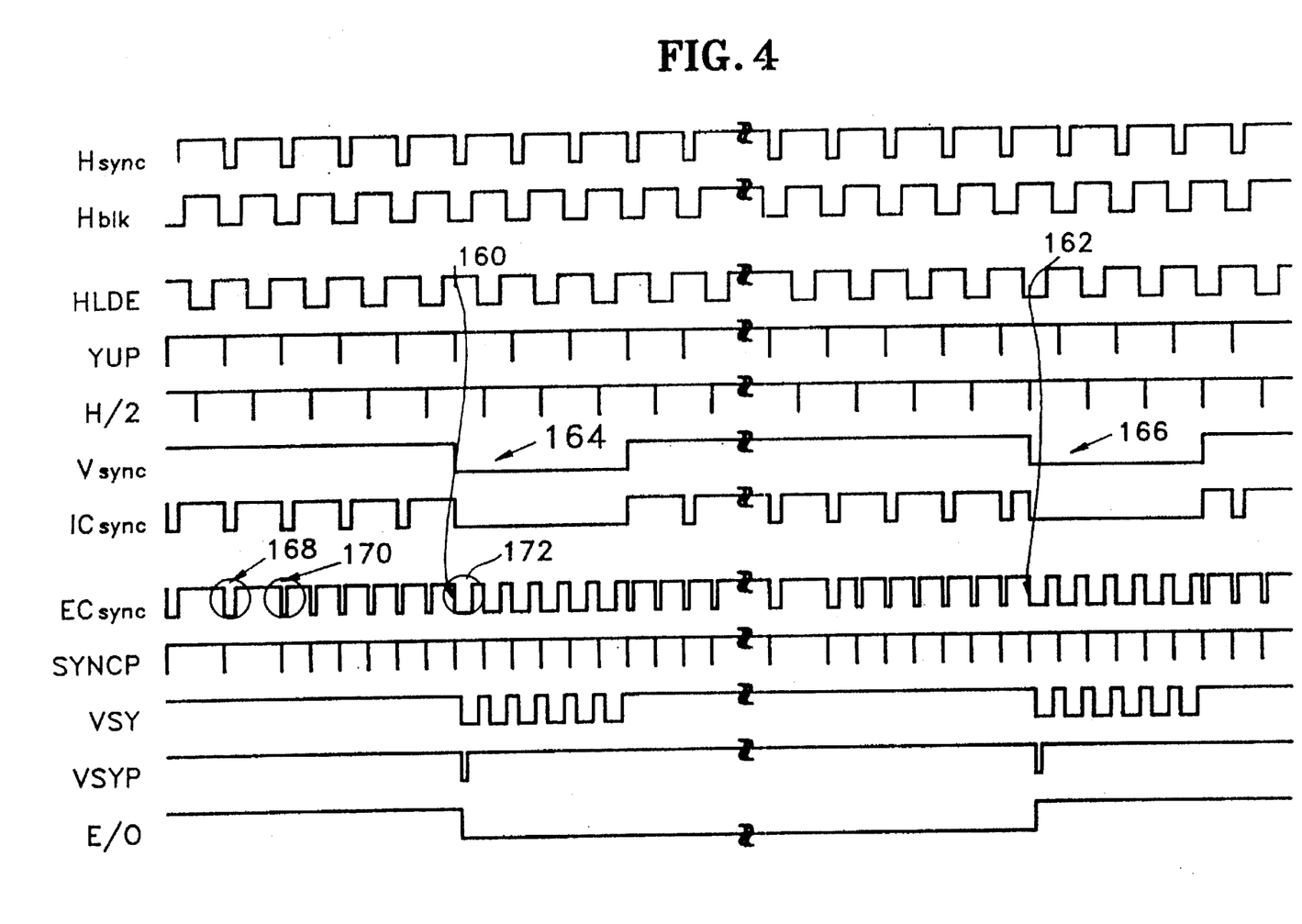
FIG. 4 depicts waveform diagrams at various locations of the circuit of FIG. 3.

FIG. 3 shows the block diagram of an exemplary synchronization signal generator 30 and FIG. 4 shows waveforms at various locations in the circuitry of FIG. 3. Advantageously, sync signal generator 30 includes a leading edge detector 120, an external sync input detector 122, an external vertical sync leading edge detector 124, a field distinguisher 126, a horizontal sync generator 128, a vertical sync generator 130, a signal combiner 132, and a sync selector 134.

Leading edge detector 120 receives the external composite sync signal (ECsync) shown in FIG. 4, to thereby output a pulse leading edge detection signal (SYNCP) for detecting the leading edge of each sync pulse signal.

An external sync input detecting circuit 122 includes a flip-flop FF1 (122a) which synchronizes the pulse leading edge detecting signal (SYNCP) to the clock signal (CLK), a flip-flop FF2 (122b) which synchronizes the internal synchronization restoring signal (V256) to the clock signal (CLK), and a flip-flop FF3 (122c) being cleared by the output of the flip-flop FF1 to thereby generate the external sync input detecting signal (VDO). It will be appreciated that if the output of the flip-flop FF1 stays high, flip-flop FF3 clocks-in the output of the flip-flop FF2 to thereby output the external sync input detecting signal (VDO) in a high state. Thus, if there is no input of the pulse leading edge detection signal of the external composite sync signal (ECsync), the output of the flip-flop FF1 stays high, and upon transition of the output of the flip-flop FF2 from the low state to the high state, the flip-flop FF3 generates the external sync input detection signal (VDO) in the high state. If, on the other hand, the pulse leading edge detection signal (SYNCP) input is present, since the output of the flip-flop FF1 stays low, the external sync input detection signal (VDO), which is the output of the flip-flop FF3, stays low regardless of the output of the flip-flop FF2. In other words, the VDO signal stays low if the ECsync signal input is present and goes high should the input signal be removed.

An external vertical sync leading edge detecting circuit 124 includes a counter 136 for counting the clock signal (CLK) after being cleared by the pulse leading edge detection signal (SYNCP), a vertical sync pulse leading edge detector 138 acting as detecting means for detecting the leading edge of the external vertical sync signal by decoding the counting value of counter 136 to thereby detect the pulse width of each sync pulse in response to the decoding value, and pulse generator 140 acting as pulse forming means for generating a vertical initial value loading signal (VLD) in response to the leading edge detection signal (VSYP) of FIG. 4. Counter 136 is cleared responsive to the output of the pulse leading edge detection signal (SYNCP) and then restarts counting of the clock signal (CLK). Vertical sync pulse leading edge detector 138 recognizes an equalizing pulse if the external composite sync signal (ECsync) goes high at a value not greater than the first decoding value, which advantageously can be set between 2.3 µs and 4.8 µs, a horizontal sync signal if the external composite sync signal (ECsync) goes high at the value set between a first decoding value and a second decoding value set between 4.8 µs and 27 µs, and a vertical sync pulse if the sync signal (ECsync) stays low at the value not less than the second decoding value by observing that the pulse width of the horizontal sync signal (168 of FIG. 4) is 4.8 µs, the width of the equalizing pulse (170 of FIG. 4) is 2.3 µs, and the width of the vertical sync pulse (172 of FIG. 4) is 27 µs. The first decoding value is a value between 2.3 µs and 4.8 µs; the second decoding value is set to a value between 4.8 µs and 27 µs. Accordingly, vertical sync pulse leading edge detector 138 detects only the vertical sync pulse (VSY of FIG. 4) in the external composite sync signal (ECsync) and outputs the leading edge detection signal (VSYP) of the external vertical sync signal by making the detected vertical sync pulse respond to the internal vertical sync signal (Vsync of FIG. 4). The leading edge detection signal (VSYP) is transformed into a vertical initial value loading signal (VLD) in response to the horizontal leading edge signal (YUP) of FIG. 3 and 180°-shifted horizontal leading edge signal (H/2) through pulse generator 140.

Field distinguisher 126 includes discriminator 142 acting as distinguishing means for distinguishing between odd and even fields according to the leading edge detection signal of the external vertical sync signal (VSYP) and the internal reference signal (HLDE) shown in FIG. 4, a selector 144 acting as selecting means for selecting the output signal of discriminator 142 during an external sync period and selecting the vertical blanking signal (Vblk) during an internal sync period in response to the external sync input detection signal (VDO), and pulse generator 146 acting as pulse formation means for outputting a field distinction signal (E/O) of FIG. 4 by synchronizing the output signal of selector 144 to the clock signal (CLK). The internal reference signal (HLDE) maintains a predetermined period including the half point of a horizontal period as the low state. Accordingly, at the time of an odd field, the leading edge detection signal (VSYP) of the vertical sync signal Vsync (164 of FIG. 4) goes low during the high interval (160 of FIG. 4) of the internal reference signal (HLDE). During an even field, the leading edge detection signal (VSYP) of the vertical sync signal (166 of FIG. 4) goes low during the low interval (162 of FIG. 4) of the internal reference signal. Therefore, at the time of an odd field, the field distinction signal (E/O) goes low, and stays low, and during an even field, the field distinction signal goes high and stays high.

Horizontal sync generator 128 includes a horizontal decoder 150 for receiving the counted values of a 9-bit programmable horizontal binary counter 148 for repeatedly counting from 0 to 453, to thereby generate the horizontal sync signal (Hsync), the horizontal blanking signal (Hblk), the horizontal leading edge signal (YUP), the horizontal leading edge signal shifted by 180° and the internal reference signal (HLDE) of FIG. 4 by a method for receiving the clock signal (CLK), loading 376 (the leading edge of the horizontal sync signal) and starting the counting from the initial value after being cleared at 453 set to thereby count from 0 to 453 during each section.

Vertical sync generating circuit 130 includes a vertical counter 152 for repeatedly counting from 0 to 262 by loading 244 as an initial value in response to the vertical initial value loading signal (VLD) to thereby count the horizontal leading edge signal (YUP) which is cleared at 262 a vertical decoder 154 generating the vertical sync signal (Vsync) synchronized to the horizontal leading edge signal (YUP) during the odd fields, the vertical sync signal (Vsync) synchronized to the horizontal leading edge signal (H/2) shifted by 180° during the even fields, and the vertical blanking signal (Vblk) by inputting the counting value of vertical counter 152 in response to the field distinction signal (E/O).

Signal combiner 132 includes a first signal combiner 156 generating the internal composite sync signal (ICsync) by combining the vertical sync signal (Vsync) and the horizontal sync signal (Hsync), and a second signal combiner 158 generating the blanking signal (BLK) by combining the vertical and horizontal blanking signals Vblk and Hblk. In addition, sync selector 134 selectively outputs the composite sync signal (Csync) by making the internal composite sync signal (ICsync) and the external composite sync signal (ECsync) respond to the external sync input detection signal (VDO).

Figure 5:
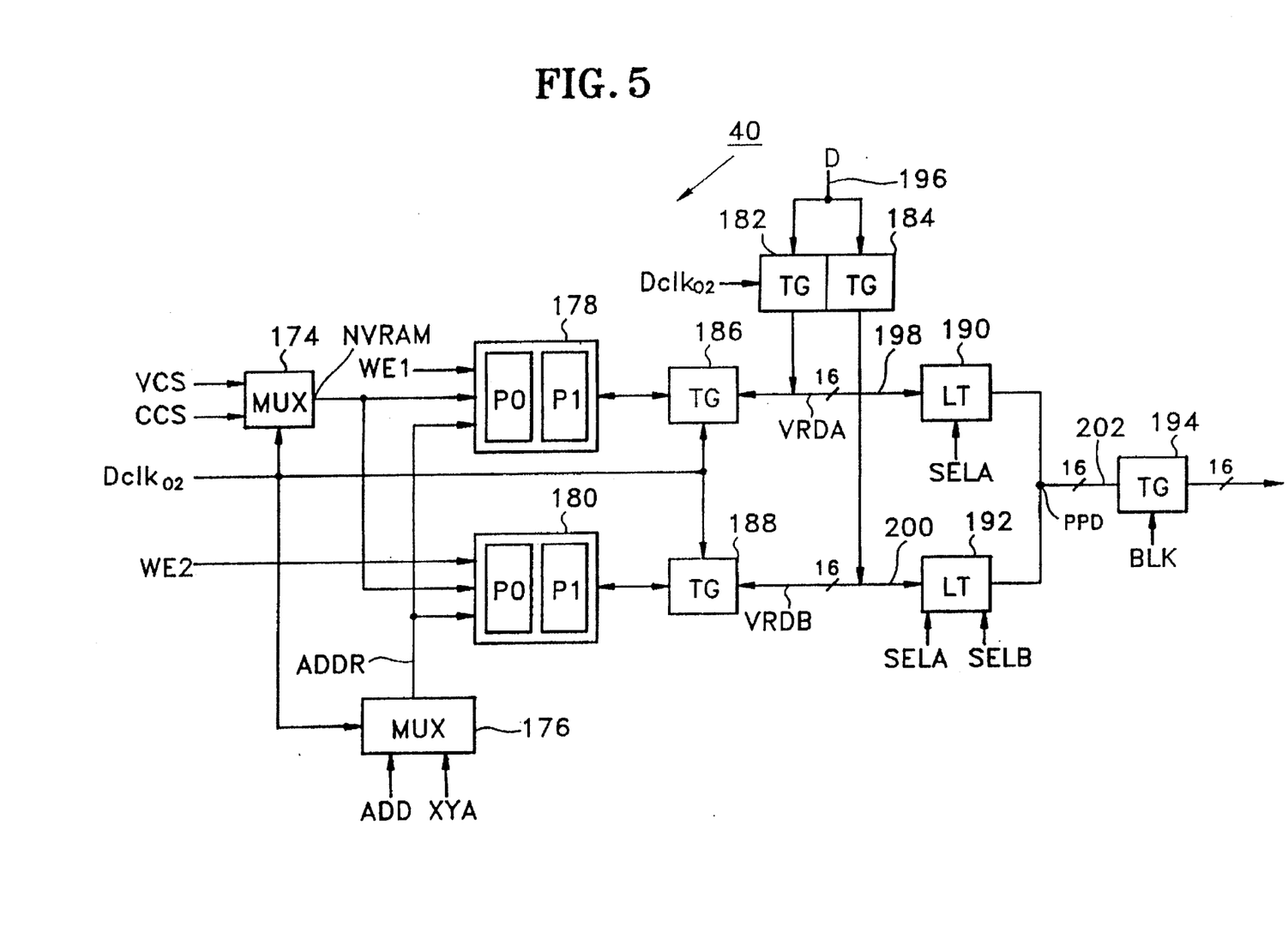
FIG. 5 is a detailed block diagram of an exemplary video memory which is usable in the circuit of FIG. 1.
Figure 6:
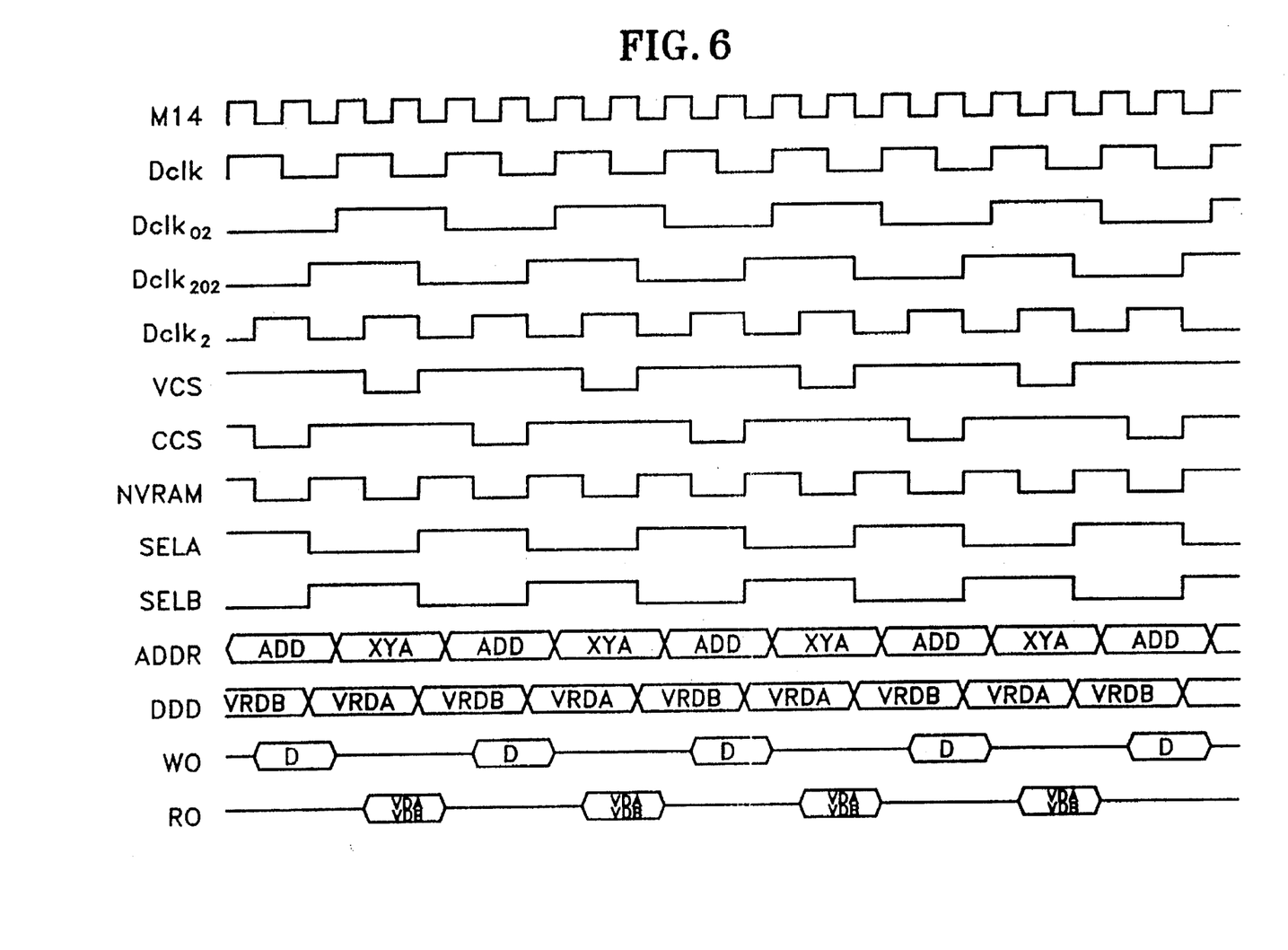
FIG. 6 depicts waveform diagrams for explaining the operation of the circuit of FIG. 5.

FIG. 5 is a block diagram of an exemplary video memory circuit 40 according to the present invention and FIG. 6 depicts operation waveform diagrams at various locations for explaining the operation of FIG. 5. Preferably, video memory circuit 40 includes a first selector 174, a second selector 176, first and second image memories 178 and 180, first and second electrical transmission gates 182 and 184, first and second two-way electrical transmission gates 186 and 188, a first latch 190 acting as latch means 190, a second latch 192 acting as latch means, and an output electrical transmission gate 194.

First selector 174 generates the chip selection signal (NVRAM) applied to image memories 178 and 180 by alternately multiplexing the first detection signal (VCS) and the second selection signal (CCS) of FIG. 6 in response to a first clock signal ($Dclk_{o2}$) of FIG. 6. The first selection signal (VCS) is a chip selection signal for reading regularly generated by hardware for screen reproduction and the second selection signal (CCS) is a chip selection signal for writing randomly generated via software. Accordingly, the first and second chip selection signals (VCS and CCS) are multiplexed in a mutually alternate way by the first clock signal ($Dclk_{o2}$).

Second selector 176 selectively outputs the address signal (ADDR) to the image memories 178 and 180 by alternately multiplexing the reproduction address signal (XYA) generated in terms of the hardware for the screen reproduction in response to the first clock signal ($Dclk_{o2}$) and the writing address signal (ADD) generated in terms of the software. Preferably, X of the reproduction address signal is a lower (dot) address signal, Y is an upper (line) address signal, and A is the uppermost address signal for selecting the page of the image memory. Accordingly, the address signal (ADDR) of FIG. 6 is the result of the writing address signal (ADD) and the reproduction address signal (XYA) being multiplexed in a mutually alternate way by the first clock signal ($Dclk_{o2}$). Advantageously, at the time of writing, while the second chip selection signal (CCS) is simultaneously supplied to the image memories 178 and 180, the address of the image memory 178 or 180, where the writing control signal (WE1 or WE2) is active, is designated. At the time of reproduction, since the first chip selection signal (VCS) is simultaneously supplied to the image memories 178 and 180, the image data of the page selected by the uppermost reproduction address signal (A) is designated in terms of the address so as to be read from the image memories 178 and 180.

Each image memory 178 and 180 has a page 0 (P0) and a page 1 (P1) and saves the portion of the image data of the first field and the second field. At the time of writing, the image memory write-controlled between one pair of the image memories 178 and 180 saves the 16-bit image data (WO) of FIG. 6 by the writing control signal (WE1 or WE2) of the image memory selected (desired to) write in the address signal (ADD) generated in terms of the software and one pair of the image memories 178 and 180. At the time of reproduction, each of the 16-bit image data (RO) is read simultaneously from the same page of the pair of the image memories 178 and 180 by the reproduction address signal (XYA).

First and second data transmission gates 182 and 184 are one-way transmission gates (TG) for transmitting the data (D) of a first data bus 196 in response to the first clock signal (Dclk$_{O2}$) to second and third data buses 198 and 200. It will be appreciated that first and second two-way transmission gates (TG) 186 and 188 transmit the data (VRDA and VRDB) of the second and third data buses 198 and 200, shown as DDD in FIG. 6, in response to the first clock signal (Dclk$_{O2}$) to the first and second image memories 178 and 180, or transmit the data VRDA and VRDB read from the first and second image memories 178 and 180 to the second and third data buses 198 and 200.

First latch (LT) 190 latches the data (VRDA) of a second data bus 198 in response to the second clock signal (SELA) at the rising edges of the second clock signal (SELA) and, after a half-clock-period delay, outputs the latched data to the fourth data bus 202 at the falling edges of the second clock signal (SELA). Second latch 192 latches the data (VRDB) of a third data bus 200 in response to the second clock signal (SELA) and the third clock signal (SELB) of FIG. 6 at the rising edges of the second clock signal (SELA) and at the same time, outputs the latched data to the fourth data bus 202 at the falling edges of the third clock signal (SELB). Accordingly, VRDA and VRDB of the second data bus 198 and the third data bus 200 are alternately output to fourth data bus 202 in the order of VRDB and VRDA by the first and second latches 190 and 192. Preferably, the output transmission gate (TG) 194 is the one-way transmission gate for providing the data (PPD) of the fourth data bus 202 to superimposing circuit 50 in response to the blanking signal (BLK) in the effected section.

The first clock signal (Dclk$_{O2}$) of FIG. 6 is the clock signal having the frequency of 3.58 MHz obtained by half-frequency-dividing the clock signal Dclk of FIG. 6, whose frequency is 7.16 MHz, which signal is obtained by half-frequency-dividing the reference clock signal (M14) of 14.32 MHz. The Dclk$_{202}$ of FIG. 6 is a clock signal which leads Dclk$_{O2}$ by 45° while Dclk$_2$ is a signal lagging Dclk by 45°. The active section of the signal VCS is the signal produced by logically multiplying the high section of the Dclk$_2$ with the high section of Dclk$_{202}$, the active section of the signal CCS is provided by logically multiplying the high section of the Dclk$_2$ with the low section of the Dclk$_{202}$. It should be noted that the active state of the signal, the signal CCS is not generated continuously as with signal VCS, the active state of signal CCS is generated randomly by the software. Accordingly, the writing and reproduction operation respectively operate at 3.58 MHz. It should also be noted that SELA is the clock signal Dclk$_{202}$ phase shifted by 180°; SELB is the inverse of SELA.

Figure 7:
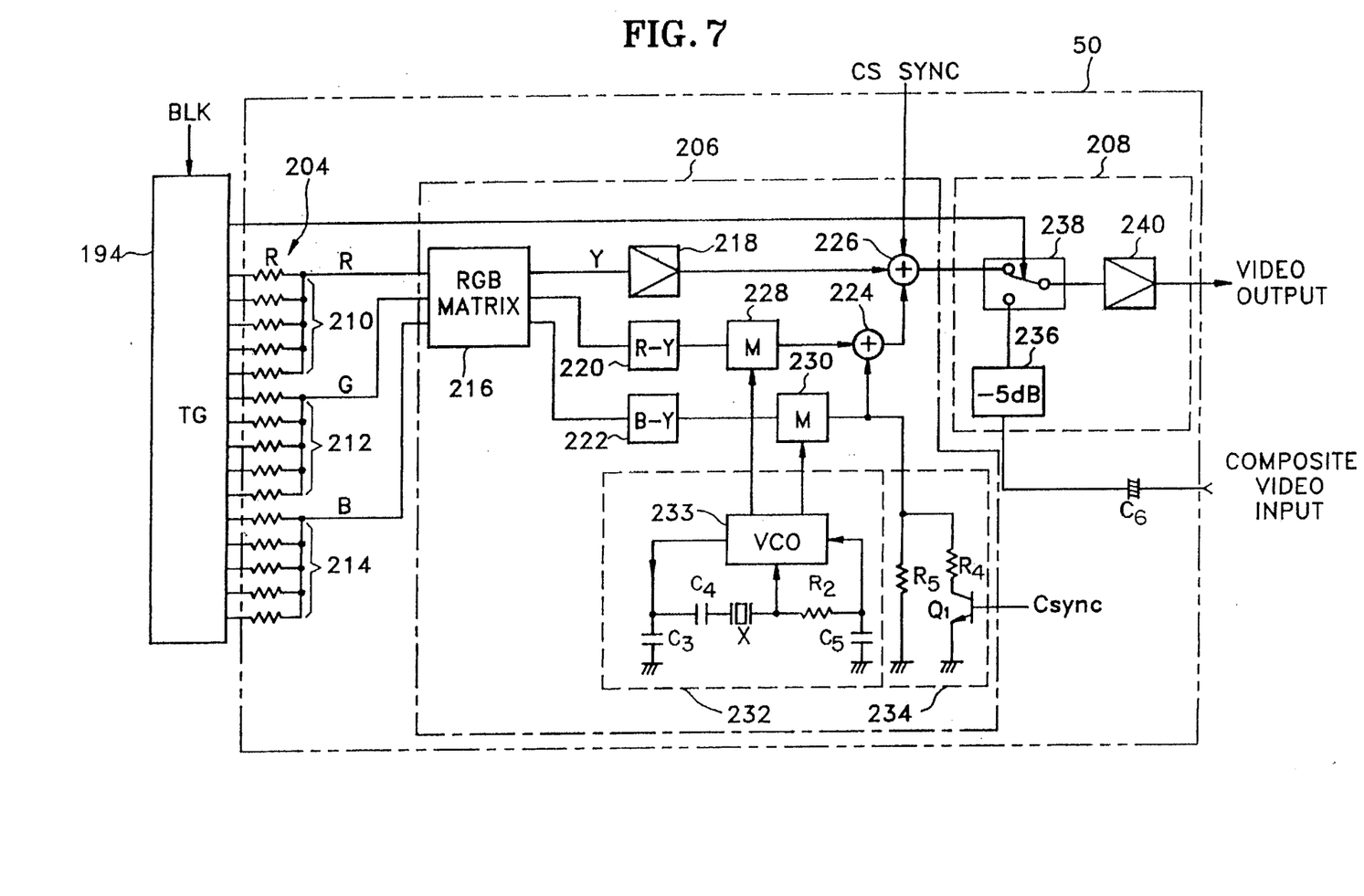
FIG. 7 is a detailed circuit diagram of the video superimposing circuit which is usable in the circuit of FIG. 1.

FIG. 7 shows an exemplary circuit for the superimposing circuit 50 of the present invention. Superimposing circuit 50 includes a signal combiner 204, an NTSC encoder 206, and a superimposing circuit 208 acting as superimposing means. The signal combiner 204 includes three 5-resistor arrays 210, 212 and 214 which generate the combined R signal, G signal, and B signal by inputting 5-bit R data, 5-bit G data, and 5-bit B data, respectively. Encoder 206 includes an RGB matrix 216, a luminance signal amplifier 218, modulators 220 and 222, a first mixer 224, a second mixer 226, a first compensator 228, a second compensator 230, a phase matching circuit 232, and a burst level adjuster 234. The control signal supplied to burst level adjuster 234 is the output signal of sync selector 134. Superimposing circuit 208 includes an attenuator 236, a switch 238 acting as switching means, and an output amplifier 240.

Further to the discussion of FIG. 5, transmission gate 194 inputs the uppermost bit which is a video selection bit, and RGB data of five bits and provides an output in response to the blanking signal (BLK). If the value of the uppermost bit is 0, the internal image signal is selected, and if it is 1, the external image signal is selected.

RGB matrix 216 receives RGB data to generate the luminance signal and the first and second color difference signals (B-Y and R-Y). The luminance signal is amplified through a luminance signal amplifier 218, and the first and second color difference signals are respectively modulated by modulators 220 and 222. The modulated color signal is compensated so that a phase distortion is not generated during the superimposing period through first and second compensators 228 and 230. The first and second compensators respond to the first and second control signals generated by a phase matching circuit 232. Phase matching circuit 232 advantageously includes a voltage-controlled oscillator 233, a crystal oscillator (X) of 3.58 MHz, capacitors (C$_3$–C$_5$), and a resistor (R$_3$) to input the first and second color carrier waves to voltage-controlled oscillator 233 and outputs the color carrier wave from voltage-controlled oscillator 233 to thereby generate the first and second control signal phase-locked controlled by the output color carrier wave. The phase-compensated modulation color signals are mixed by a first mixer 224 to be output as the carrier color signal. Color burst level adjustor 234 acting as burst level adjusting means, which preferably includes resistors (R$_4$ and R$_5$) and a transistor (Q$_1$) is level-adjusted by the value of the resistor (R$_4$) at the time of inputting the external image signal and level-adjusted by the value of the parallel connection resistor of the resistors (R$_4$ and R$_5$) when there is no external image signal. The carrier color signal mixes the amplified luminance signal and the composite sync signal in a second mixer 226 to output as the composite image signal. The external image signal is supplied to the −5 dB attenuator 236 through a coupling capacitor (C$_6$) and attenuated. Preferably, the attenuated external image signal and the composite image signal respond to the uppermost bit of the transmission gate 194 to thereby be selected by switch 238, which is switched at high speed so that pixel units can be superimposed. The image signal on which the composite image signal is superimposed with the external image signal is amplified by output amplifier 240, which thereby outputs the amplified signal.

As described hereinabove, in the present invention, when outputting digital image information superimposed with an external analog image signal, since the internal digital image information is synchronized with the external image signal to superimpose each pixel at high speed, the screen distortion phenomenon generated at the time of superimposing can be prevented and high speed operation can be realized.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. An image superimposing apparatus comprising:
   a synchronization separator for separating an external composite sync signal from an external composite video signal;
   a clock signal generator for adjusting the frequency of a clock signal permitting the clock signal to be synchronized to an external sync signal according to a phase difference between a horizontal sync signal in the separated external composite sync signal and an internal horizontal sync signal, and for generating the adjusted clock signal;

a sync signal generator for generating an internal composite sync signal and a reproduction address signal, responsive to the adjusted clock signal from said clock signal generator;

a video memory for reading digital video information stored according to the reproduction address signal from said sync signal generator and writing the digital video information according to a writing address signal; and a superimposing circuit for restoring the digital video information read from said video memory as an RGB signal, encoding said internal composite sync signal and said restored RGB signal as a color television signal, and superimposing the encoded color television signal with said external composite video signal for output.

2. The apparatus according to claim 1, wherein said clock signal generator comprises:

a horizontal sync separator for detecting the horizontal sync signal in said separated external composite sync signal;

a phase difference detector for detecting the phase difference between the internal horizontal sync signal of said internal composite sync signal and the horizontal sync signal of said external composite sync signal and for generating a phase difference detection signal;

a sync detector for detecting the presence of said external composite sync signal to thereby generate a sync detection signal;

a first oscillator for generating a first oscillation signal at a first frequency;

a second oscillator for generating a second oscillation signal at a second frequency;

a signal selector for selecting said first oscillation signal in response to said sync detection signal when an external sync input is present, and for selecting and outputting the second oscillation signal when there is no external sync input present;

gate means for controlling the passage of said phase difference detection signal in response to said sync detection signal; and a frequency divider for receiving and frequency-dividing a selected one of said first and said second oscillation signals selected by said signal selector, dividing by delaying the selected oscillation signal by the phase difference during an external synchronization operation, and generating the frequency-divided signal as the clock signal in response to the phase difference detection signal passing through said gate means.

3. The apparatus according to claim 1, wherein said sync signal generator comprises:

a leading edge detector for detecting the leading edge of the external composite sync signal thereby generating a first signal;

an external sync input detector in response to the first signal to thereby output an external sync input detection signal for detecting input of said external composite sync signal;

an external vertical sync leading edge detector responsive to the first signal for counting the pulse width of external sync pulses as the clock signal and detecting the leading edge of the external sync signal by a counted value thereby generating a second signal;

a field distinguisher for comparing an internal reference signal with said second signal to thereby generate a field distinction signal for distinguishing between an even field and an odd field;

a horizontal sync generator for counting the clock signal and decoding a counted value to generate a horizontal sync signal and a horizontal blanking signal;

a vertical sync generator for counting the leading edge signal of the horizontal sync signal of said horizontal sync generator and decoding a counted value to generate a vertical sync signal and a vertical blanking signal responding to said field distinction signal;

a signal combiner for combining said horizontal and vertical sync signals to generate the internal composite sync signal and combining said horizontal and vertical blanking signals to generate a blanking signal; and a sync selector responsive to a third signal output by said external sync input detector for selecting one of the external composite sync signal and the internal composite sync signal to thereby generate a respective sync signal.

4. The apparatus according to claim 3, wherein said external sync input detector comprises:

a first flip-flop for synchronizing a pulse of said first signal to the clock signal;

a second flip-flop for synchronizing an internal sync restoring signal to the clock signal; and a third flip-flop cleared by an output of said first flip-flop for generating the external sync input detection signal in a low state and clocking in the output of the second flip-flop if an output of the first flip-flop stays high so as to output the external sync input detection signal in a high state.

5. The apparatus according to claim 3, wherein said external vertical sync leading edge detector comprises:

a counter cleared by the first signal for counting the clock signal;

vertical sync pulse leading edge detection means for decoding a counted value from the counter to thereby detect the leading edge of an external vertical sync signal in response to the decoded counted value and generating a leading edge detection signal;

pulse forming means responsive to the leading edge detection signal for generating a vertical initial value loading signal.

6. The apparatus according to claim 3, wherein said field distinguisher comprises:

distinguishing means for distinguishing between said odd field and said even field by said second signal from an external vertical sync signal and the internal reference signal;

selecting means responsive to the external sync input detection signal for selecting the output signal of said distinguishing means during an external sync period and for selecting the vertical blanking signal during an internal sync period; and pulse forming means for making a selected output signal of said selecting means synchronize to the clock signal for output as the field distinction signal.

7. The apparatus according to claim 1, wherein said video memory comprises:

a first selector responsive to a first clock signal to alternately multiplex a first selection signal and a second selection signal;

a second selector responsive to said first clock signal to alternately multiplex the reproduction address signal and the writing address signal;

first and second image memories responsive to a writing control signal, the respective output signal of said first selector, and the respective output signal of the second selector for selectively writing and reading data;

first and second data transmission gates responsive to said first clock signal to transmit data from a first data bus to a second and a third data buses;

first and second two-way transmission gates responsive to said first clock signal for transmitting the data on the second and third data buses to respective said first and second image memories and for transmitting the data read from the first and second image memories to said second and third data buses;

first latching means for latching respective data on said second data bus in response to a second clock signal and outputting a first latched data, which said first latched data is half-clock lagged, to a fourth data bus;

second latching means for latching respective data of said third data bus in response to the second clock signal and a third clock signal, and at the same time, outputting a second latched data to the fourth data bus; and an output transmission gate for transmitting the respective data on said fourth data bus.

8. The apparatus according to claim 1, wherein said superimposing circuit comprises:

a signal combiner receiving N bits for separating RGB data of the remaining N−1 bits after excluding the uppermost bit of an output transmission gate into the R, G and B data, respectively, to generate an R signal, a G signal, and a B signal;

an RGB matrix receiving said R signal, G signal, and B signal for generating a luminance signal, a first color difference signal, and a second color difference signal;

a luminance signal amplifier for amplifying said luminance signal;

a pair of modulators for modulating said first and said second color difference signals, respectively, thereby generating first and second modulated color signals;

a first mixer for combining said first and second modulated color signals to thereby generate a color carrier signal;

a second mixer for combining said color carrier signal, the amplified luminance signal, and the internal composite sync signal to thereby generate the encoded color television signal;

an attenuator for attenuating the external composite video signal;

an image signal selector for selectively outputting the attenuated external composite video signal and the encoded color television signal according to the value of said uppermost bit; and an output amplifier for amplifying the selected output of said image signal selector.

9. The apparatus according claim 8, wherein said superimposing circuit further comprises:

a first compensator for compensating the phase of the first modulated color signal for supply to the first mixer;

a second compensator for compensating the phase of the second modulated color signal for supply to said first mixer; and a phase matching circuit for phase-locking the color carrier signal during a superimposing operation to thereby generate first and second control signals necessary for synchronizing a color burst signal and the respective first and second color difference signals supplied to said pair of modulators.

10. An image superimposing apparatus comprising:

synchronization separator means for separating an external composite sync signal from an external composite video signal;

clock signal generator means for adjusting the frequency of a clock signal permitting the clock signal to be synchronized to an external sync signal according to a phase difference between a horizontal sync signal in the separated external composite sync signal and an internal horizontal sync signal, and for generating the adjusted clock signal;

sync signal generator means for generating an internal composite sync signal and a reproduction address signal responsive to the adjusted clock signal from said clock signal generator means;

video memory means for reading digital video information stored according to the reproduction address signal from said sync signal generator means; and superimposing means for converting the digital video information reproduced from said video memory means as an RGB signal, for encoding said internal composite sync signal and said RGB signal as a color television signal, and for superimposing the encoded color television signal with said external composite video signal for output.

11. The apparatus according to claim 10, wherein said clock signal generator means comprises:

horizontal sync separator means for detecting the horizontal sync signal in said separated external composite sync signal;

phase difference detector means for detecting the phase difference between the internal horizontal sync signal of said internal composite sync signal and the horizontal sync signal of said external composite sync signal and for generating a phase difference detection signal;

sync detector means for detecting the presence of said external composite sync signal to thereby generate a sync detection signal;

first oscillator means for generating a first oscillation signal at a first frequency;

second oscillator means for generating a second oscillation signal at a second frequency;

signal selector means for selecting said first oscillation signal in response to said sync detection signal when an external sync input is present, and for selecting and outputting the second oscillation signal when there is no external sync input present;

gate means for controlling the passage of said phase difference detection signal in response to said sync detection signal; and frequency divider means for receiving and frequency-dividing a selected one of said first and said second oscillation signals selected by said signal selector means, for dividing by delaying the selected oscillation signal by the phase difference during an external synchronization operation, and for generating the frequency-divided signal as the clock signal in response to the phase difference detection signal passing through said gate means.

12. The apparatus according to claim 10, wherein said sync signal generator means comprises:

leading edge detector means for detecting the leading edge of the external composite sync signal thereby generating a first signal;

external sync input detector means responsive to the first signal to thereby output an external sync input detection signal for detecting input of said external composite sync signal;

external vertical sync leading edge detector means responsive to the first signal for counting the pulse width of external sync pulses as the clock signal and for detecting the leading edge of the external sync signal by a counted value thereby generating a second signal;

field distinguisher means for comparing an internal reference signal with said second signal to thereby generate a field distinction signal for distinguishing between an even field and an odd field;

horizontal sync generator means for counting the clock signal and for decoding a counted value to generate a horizontal sync signal and a horizontal blanking signal;

vertical sync generator means for counting the leading edge signal of the horizontal sync signal of said horizontal sync generator means and for decoding a counted value to generate a vertical sync signal and a vertical blanking signal responding to said field distinction signal;

signal combiner means for combining said horizontal and vertical sync signals to generate the internal composite sync signal and combining said horizontal and vertical blanking signals to generate a blanking signal; and sync selector means responsive to a third signal output by said external sync input detector means for selecting one of the external composite sync signal and the internal composite sync signal to thereby generate a respective sync signal.

13. The apparatus according to claim 12, wherein said external sync input detector means comprises:

a first flip-flop for synchronizing a pulse of said first signal to the clock signal;

a second flip-flop for synchronizing an internal sync restoring signal to the clock signal; and a third flip-flop cleared by an output of said first flip-flop for generating the external sync input detection signal in a low state and clocking in the output of the second flip-flop if an output of the first flip-flop stays high so as to output the external sync input detection signal in a high state.

14. The apparatus according to claim 12, wherein said external vertical sync leading edge detector means comprises:

a counter cleared by the first signal for counting the clock signal;

vertical sync pulse leading edge detection means for decoding a counted value from the counter to thereby detect the leading edge of an external vertical sync signal in response to the decoded counted value and generating a leading edge detection signal; and pulse forming means responsive to the leading edge detection signal for generating a vertical initial value loading signal.

15. The apparatus according to claim 12, wherein said field distinguisher means comprises:

distinguishing means for distinguishing between said odd field and said even field by said second signal from an external vertical sync signal and the internal reference signal;

selecting means responsive to the external sync input detection signal for selecting the output signal of said distinguishing means during an external sync period and for selecting the vertical blanking signal during an internal sync period; and pulse forming means for making a selected output signal of said selecting means synchronize to the clock signal for output as the field distinction signal.

16. The apparatus according to claim 10, wherein said video memory means comprises:

a first selector responsive to a first clock signal to alternately multiplex a first selection signal and a second selection signal;

a second selector responsive to said first clock signal to alternately multiplex the reproduction address signal and a writing address signal;

first and second image memories responsive to a writing control signal, the respective output signal of said first selector, and the respective output signal of the second selector for selectively writing and reading data;

first and second data transmission gates responsive to said first clock signal to transmit data from a first data bus to a second and a third data buses;

first and second two-way transmission gates responsive to said first clock signal for transmitting the data on the second and third data buses to respective said first and second image memories and for transmitting the data read from the first and second image memories to said second and third data buses;

first latching means for latching respective data on said second data bus in response to a second clock signal and outputting a first latched data, which said first latched data is half-clock lagged, to a fourth data bus;

second latching means for latching respective data of said third data bus in response to the second clock signal and a third clock signal, and at the same time, outputting a second latched data to the fourth data bus; and an output transmission gate for transmitting the respective data on said fourth data bus.

17. The apparatus according to claim 10, wherein said superimposing means comprises:

a signal combiner receiving N bits for separating RGB data of the remaining N−1 bits after excluding the uppermost bit of an output transmission gate into the R, G and B data, respectively, to generate an R signal, a G signal, and a B signal;

an RGB matrix receiving said R signal, G signal, and B signal for generating a luminance signal, a first color difference signal, and a second color difference signal;

a luminance signal amplifier for amplifying said luminance signal;

a pair of modulators for modulating said first and said second color difference signals, respectively, thereby generating first and second modulated color signals;

a first mixer for combining said first and second modulated color signals to thereby generate a color carrier signal;

a second mixer for combining said color carrier signal, the amplified luminance signal, and the internal composite sync signal to thereby generate the encoded color television signal;

an attenuator for attenuating the external composite video signal;

an image signal selector for selectively outputting the attenuated external composite video signal and the encoded color television signal according to the value of said uppermost bit; and an output amplifier for amplifying the selected output of said image signal selector.

18. The apparatus according claim 17, wherein said superimposing means further comprises:
- a first compensator for compensating the phase of the first modulated color signal for supply to the first mixer;
- a second compensator for compensating the phase of the second modulated color signal for supply to said first mixer; and
- a phase matching circuit for phase-locking the color carrier signal during a superimposing operation to thereby generate first and second control signals necessary for synchronizing a color burst signal and the respective first and second color difference signals supplied to said pair of modulators.

19. The apparatus according to claim 10, wherein said sync signal generator means comprises:
- leading edge detector means for detecting the leading edge of the external composite sync signal thereby generating a first signal;
- external sync input detector means responsive to the first signal to thereby output an external sync input detection signal for detecting input of said external composite sync signal, wherein said external sync input detector means comprises:
  - a first flip-flop for synchronizing a pulse of said first signal to the clock signal;
  - a second flip-flop for synchronizing an internal sync restoring signal to the clock signal; and
  - a third flip-flop cleared by an output of said first flip-flop for generating the external sync input detection signal in a low state and clocking in the output of the second flip-flop if an output of the first flip-flop stays high so as to output the external sync input detection signal in a high state;
- external vertical sync leading edge detector means responsive to the first signal for counting the pulse width of external sync pulses as the clock signal and for detecting the leading edge of the external sync signal by a counted value thereby generating a second signal, wherein said external vertical sync leading edge detector means comprises:
  - a counter cleared by the first signal for counting the clock signal;
  - vertical sync pulse leading edge detection means for decoding a counted value from the counter to thereby detect the leading edge of an external vertical sync signal in response to the decoded counted value and generating a leading edge detection signal; and
  - first pulse forming means responsive to the leading edge detection signal for generating a vertical initial value loading signal;
- field distinguisher means for comparing an internal reference signal with said second signal to thereby generate a field distinction signal for distinguishing between an even field and an odd field, wherein said field distinguisher means comprises:
  - distinguishing means for distinguishing between said odd field and said even field by said second signal from the external vertical sync signal and the internal reference signal;
  - selecting means responsive to the external sync input detection signal for selecting the output signal of said distinguishing means during an external sync period and for selecting a vertical blanking signal during an internal sync period; and
  - second pulse forming means for making a selected output signal of said selecting means synchronize to the clock signal for output as the field distinction signal;
- horizontal sync generator means for counting the clock signal and for decoding a counted value to generate a horizontal sync signal and a horizontal blanking signal;
- vertical sync generator means for counting the leading edge signal of the horizontal sync signal of said horizontal sync generator and for decoding a counted value to generate a vertical sync signal and the vertical blanking signal responding to said field distinction signal;
- signal combiner means for combining said horizontal and vertical sync signals to generate the internal composite sync signal and combining said horizontal and vertical blanking signals to generate a blanking signal; and
- sync selector means responsive to a third signal output by said external sync input detector means for selecting one of the external composite sync signal and the internal composite sync signal to thereby generate a respective sync signal.

\* \* \* \* \*